United States Patent [19]

Vamvakas et al.

[11] 3,934,703

[45] Jan. 27, 1976

[54] CONTAINER DISCHARGER WITH SAFETY MECHANISM

[75] Inventors: Michael Vamvakas, Rocky River, Ohio; Momir Babunovic, Des Peres, Mo.

[73] Assignee: Barry-Wehmiller Company, St. Louis, Mo.

[22] Filed: Dec. 20, 1974

[21] Appl. No.: 534,743

[52] U.S. Cl. .................. 198/22 B; 198/25; 198/37; 198/288

[51] Int. Cl.$^2$ ........................................ B65G 47/00

[58] Field of Search ..... 221/21; 198/22 B, 25, 22 R, 198/288, 37

[56] References Cited

UNITED STATES PATENTS

| | | | |
|---|---|---|---|
| 2,858,929 | 11/1958 | Vamvakas | 198/25 |
| 3,178,005 | 4/1965 | Read | 198/25 X |
| 3,406,808 | 10/1968 | Babunovic | 198/22 X |

*Primary Examiner*—Allen N. Knowles
*Attorney, Agent, or Firm*—Gravely, Lieder & Woodruff

[57] ABSTRACT

A container discharger with safety mechanism consisting of a group of finger elements positioned to guide the containers in the initial discharge from the pockets of a conveyor, and in which the finger elements are mounted so as to be readily movable when engaged by even one misplaced or improperly discharged bottle, a safety switch in the power circuit of the apparatus which is actuated in response to the movement of any finger element being engaged by a bottle not in proper discharge position to stop the apparatus, and means to jiggle the fingers with the object in mind of dislodging any improperly placed bottle so that there will be no need to dismantle the apparatus or remove any components.

7 Claims, 5 Drawing Figures

CONTAINER DISCHARGER WITH SAFETY MECHANISM

BACKGROUND OF THE INVENTION

This invention is directed to improvements in container discharger for bottle conditioning apparatus such as washing apparatus for an example and in which safety mechanism is incorporated.

Heretofore, washers have been provided with a container or bottle discharge means which combined bottle guides, landing platforms and conveyor sections associated with a unit movable to stop the apparatus in response to a bottle failing to properly discharge. It is at once appreciated that in a multiple width carrier the mass of the combined components becomes quite unresponsive to rapid stopping and when the apparatus is finally stopped the bottles that have made the proper discharge are in positions where they are liable to topple if disturbed, and this can further complicate the restoration of the apparatus to continuing operation.

Prior mechanisms for handling the discharge of bottles from conditioning machines have involved the simultaneous dropping of forty or more bottles, and the structure needed to handle this mass is quite substantial and not easily moved rapidly if one or two bottles hang up and do not drop with all the others. When stoppage is achieved it may be that a component of the mechanism has been bent or moved out of proper alignment, or the bottles that have dropped successfully will topple forward as the position thereof is not sufficiently stable to resist toppling.

The general aim of this invention is to avoid and overcome these and other problems that exist or require attention so that a more efficient discharge apparatus can be provided.

BRIEF SUMMARY OF THE INVENTION

An important object of this invention is directed to an improvement in dischargers for bottle conditioning apparatus having a bottle carrier with pockets movable over a guide ending in a bottle discharge drop-off station aligned with a bottle lowering mechanism communicating with a platform and pushing bottles over the platform and onto a conveyor, and in which the improvement further comprises a safety means in the form of a plurality of fingers movable together, and each having one end portion adjacent said bottle lowering mechanism in position to be engaged by and support bottles with the crown portion free of contact with the finger, means supporting an opposite portion of each finger for movement generally in the direction toward or away from said bottle drop-off station, and a safety switch responsive to movement of said fingers, to interrupt operation of the bottle conditioning apparatus. Each finger is formed with a surface portion spaced from said bottle drop-off station at least the distance of a bottle diameter and adjacent the path of travel of the bottle carrier pockets so that the finger surface portion will be engaged by a bottle failing to drop clear of its carrier pocket and move said finger away from said bottle drop-off station to actuate the safety switch for stopping the machine.

Other important objects of this invention are directed to means to adjust the position of the bottle engaging fingers to accommodate bottles of different sizes, to place the safety switch in command of the power for stopping the operation of the bottle conditioning apparatus, to utilize the motion of only the fingers to actuate the safety switch so that the movement of large masses of the apparatus and disturbing the properly discharged bottle may be avoided, to utilize the fingers to support the bottle in a position such that upon stopping of the apparatus bottles will not be caused to topple and become disarranged, and to provide means for moving the fingers back and forth after the apparatus has stopped for the purpose of achieving dislodgement of the obstructing bottle while avoiding the more complicated chore of dismantling parts of the assembly to reach the trouble area.

DESCRIPTION OF THE EMBODIMENTS

Figure 1:
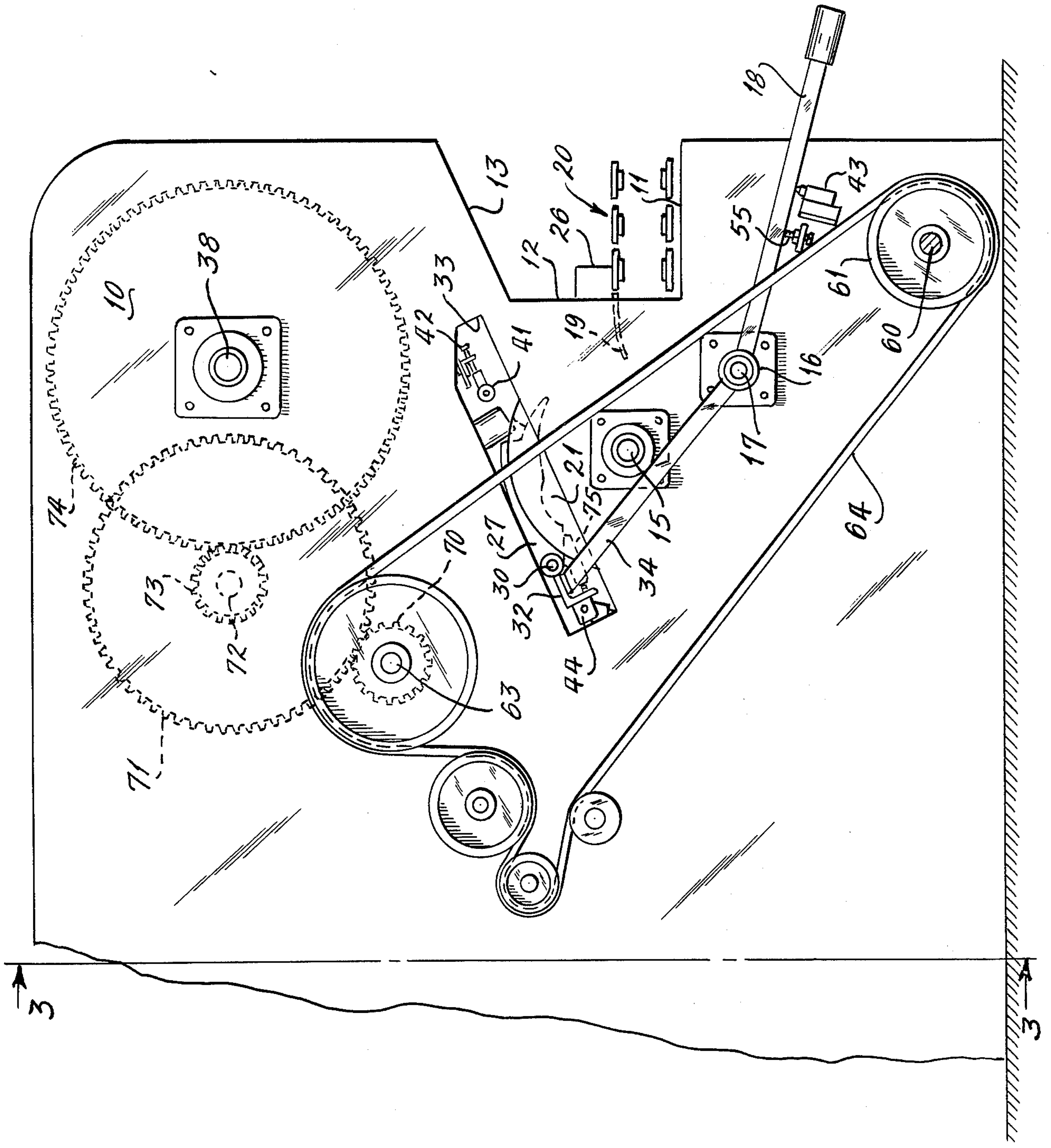
FIG. 1 is a side elevation view of a portion of the bottle conditioning apparatus showing the power drive on the outside of the tank wall and discharge conveyor for carrying off the bottles as they are discharged.
Figure 3:
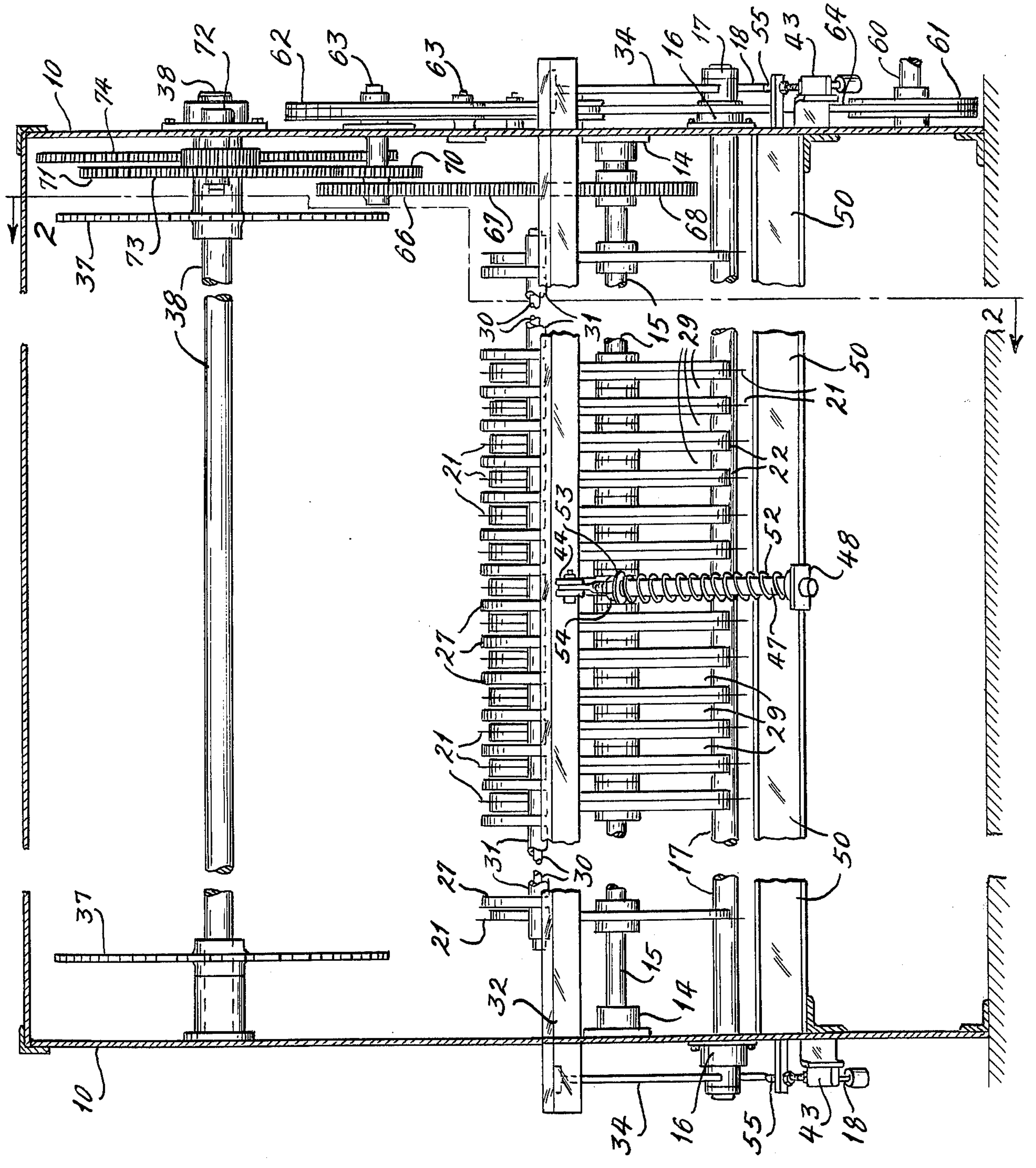
FIG. 3 is a fragmentary transverse view of the internal mechanism as seen at line 3—3 in FIG. 1.

The bottle discharger apparatus of FIGS. 1 and 3 has certain structure which comprises spaced side sheets 10, each having a cut-out portion indicated at the margins 11, 12 and 13. Each side sheet 10 supports a bearing 14 for a cam shaft 15 which extends across the width of the apparatus between side sheets 10 (FIG. 3). Each side sheet 10 also supports a bearing 16 for a pivot shaft 17 which supports levers 18, one at each external side of the apparatus. Bottle landing plates 19 extends across the width of the apparatus at the cut-out margin 12, and a bottle collecting and feed-off conveyor 20 is mounted above the cut-out margin 11.

The cam shaft 15 (FIGS. 2, 3 and 5) carries a plurality of axially spaced guide discs 21, and the facing surfaces of adjacent discs carry cam elements 22 so that there are a pair of steps 23 and a pair of bottle pusher surfaces 24. Thus, for each complete revolution of each pair of the disc 21 two bottles will be handled. At about the level of the shaft 15 there are disposed the bottle landing plates 19 which are narrow so as to project into and between the guide discs 21 and cams 22. As each cam step 23 passes below the landing plates 19 the bottle is picked off by the plates and the cam pusher surfaces 24 can then slide the bottles outwardly and, as subsequent bottles are treated in the same manner, the bottles will eventually be crowded onto the conveyor 20 by moving between fixed partitions 26 aligned with the discs 21.

Figure 2:
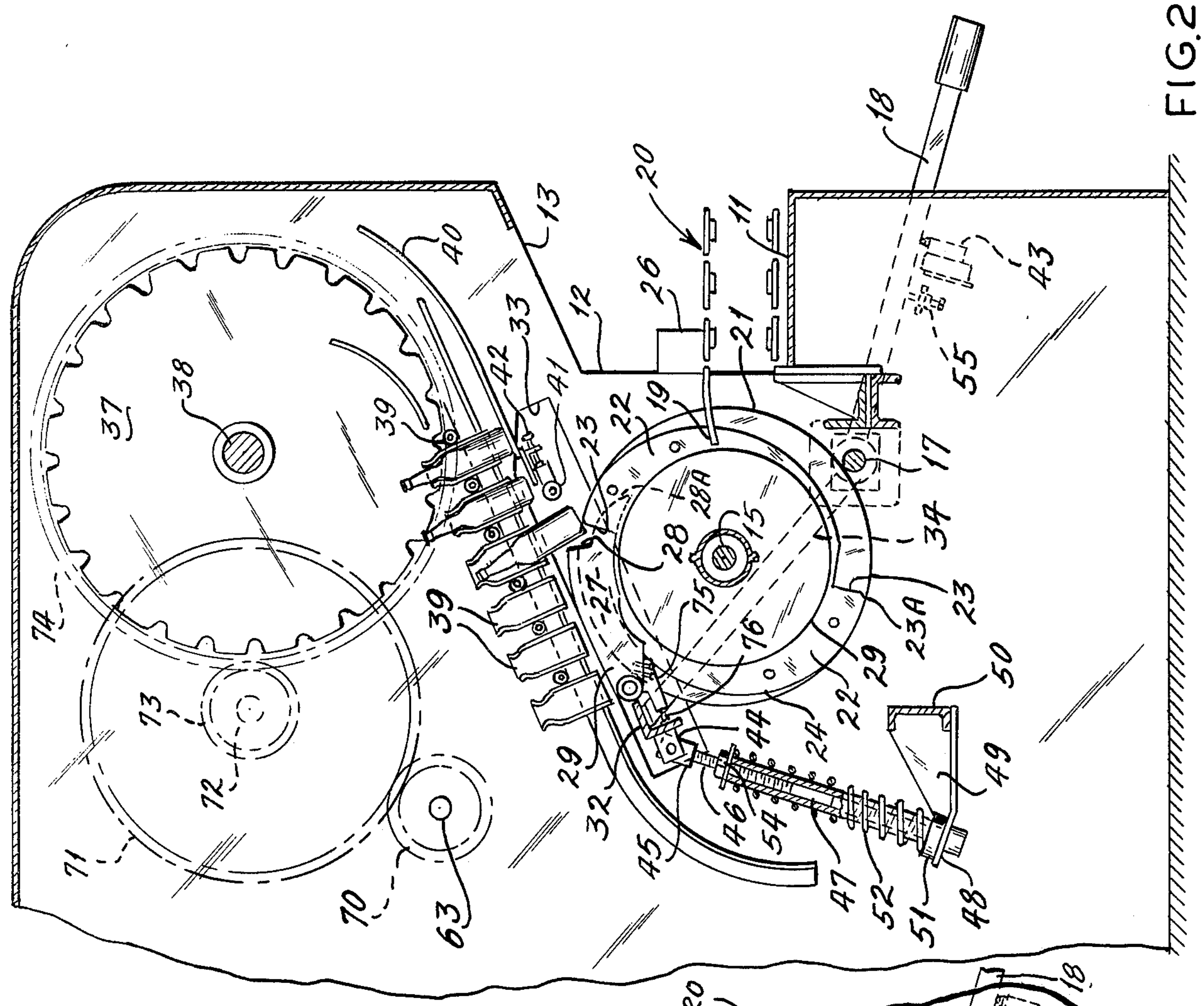
FIG. 2 is a side elevation view of the mechanism inside the apparatus as seen at line 2—2 in FIG. 3 with the near side of the tank wall removed.

FIGS. 2 and 3 show the assembly of the safety fingers 27 in which a finger 27 is disposed between each pair of discs 21, and its abutment end 28 is supported so as to be suspended in spaced above the shaft 15. Each finger 27 is formed with a bottle abutment surface 28 at the free end and the opposite end 29 is pivotally connected to a shaft 30. The shaft 30 (FIG. 3) extends across the width of the apparatus and is carried by a series of spaced bearing eyes 31 secured to one edge of an angle bar 32 that spans the assembly of cams 22 and discs 21 and project to the outside through suitable windows 33. The opposite ends of the angle bar 32 are connected respectively to arms 34, and these arms are supported for pivoting movement about the axis of the common shaft 17 which extends across the width of the apparatus and is mounted in end bearings 16 (FIG. 3). The arms 34 are coordinated to move together by the shaft 17 with the result that the angle bar 32 is moved through an arcuate path with the center in the axis of shaft 17. The movement of the angle bar 32 causes the group of fingers 27 to move the free ends 28 relative to the cams 22. The end 28 of each finger is formed with a projecting nose 28A to guide the bottles.

The assembly above described is positioned below the bottle discharge zone of the apparatus and such zone is best seen in FIG. 2. The bottle conveying apparatus is provided with large diameter sprockets 37 at each end portion of a shaft 38 to move the carriers for the bottle supporting pockets 39. Power is supplied to the shaft 38 for driving the carriers which support and move the bottles along the guide wall 40 and over a roller 41 which forms the drop-off margin and assists in the proper or desired locating of the bottom of each bottle at the time of beginning of the drop. The roller 41 may be positionally adjusted by the means 42 to suit the size of bottle being conditioned. The drop zone if also defined by the several abutment surfaces 28 on the fingers 27, so that a space is formed to allow the bottles to drop onto the apex 23A of the rotating cam step 23. The extended surface 28A of the fingers 27 cushions the impact, reduces noise, and steers the bottles onto the step 23 of the adjacent cam 22. As the bottom of each of the bottles follows a cam step 23 it is cradled between the guide discs 21 until it is set down on the plate 19 in preparation for being pushed toward the conveyor 20 by the cam surface 24.

It is observed that the line of travel of the bottom of the bottles is determined by the guide wall 40. The abutment surfaces 28 and 28A on the fingers 27 are projecting into that line of travel, but do not interfere with the line of travel of the bottom of the pockets 39. With this condition satisfied, if a bottle does not drop freely and clear the pocket in which it arrived at the drop zone it will be propelled by the pocket against the surface 28 of one of the fingers 27. Instead of a jam occuring or the bottle being crushed, the finger 27 is pushed back and either one or both of a pair of safety switches 43 (FIGS. 1 and 2) become activated to cut off the power to the drive motor for the sprocket shaft 38. This power cut-off also stops the rotation of the cam shaft 15 so that the synchronized condition of the cams and the conveyor pockets will not be upset.

THE SAFETY MECHANISM AND DRIVE

FIG. 1 discloses one embodiment of safety switch 43 that can be employed. Preliminary to describing such mechanism, it will be appreciated that the shaft 30 (FIG. 2) and the angle bar 32 which carries all of the fingers 27 is supported by the arms 34 mounted on the opposite ends of shaft 17 in bearings 16, and that both of the levers 18 will move when activated by the angle bar 32 rotating about the axis of shaft 17 through an arc that allows the fingers to back away from the drop off roller 41, thereby opening the gap at the drop zone. The motion of the fingers 27 when propelled by a bottle is utilized to trip the switch 43 in the power circuit (not believed necessary to show as it is well known) and stop the apparatus.

The angle bar 32 is provided at its mid point between the side walls (FIGS. 2 and 3) with a bracket 44 which is fixed on the back side of the bar. The bracket 44 is pinned to the upper end 45 of a rod 46 stabilized by a guide tube or sleeve 47. The rod has its upper end 45 pivoted in bracket 44 and the opposite lower end is threaded into the sleeve 47. The bottom portion of the sleeve 47 is guided by sliding in a plate 48 which is fixed to a bracket 49 mounted on a channel member 50 which is fixed at the side walls 10. The plate 48 carries a collar 51 which has an internal diameter larger than the sleeve 47 so that an annular recess is formed to capture the lower end of a spring 52. The upper end of the spring 52 presses on a washer 53 held by a nut 54 against the end of the sleeve 47. The spring 52 presses the angle bar 32 upwardly with sufficient force to over come the weight of the system of fingers 27 and the bar 32. The position of the finger elements 27 may be adjusted by threading the rod 46 in or out relative to the tube 47.

The upward push of the spring 52 and the bar 32 causes the arms 34 to pivot clockwise (FIG. 1) about the axis of shaft 17. This motion moves the levers 18 in a similar direction, but an adjustable stop 55 on each side catches the levers 18, thereby providing a second means for setting the desired position of the fingers 27 relative to the roller 41. Each safety switch 43 is located on the walls 10 adjacent the lever 18 so that when the stops 55 are adjusted, the switches will be held in normally closed position to allow for the drive to the sprockets 37. Thus, when any finger 27 is forced to the left (FIG. 2) by a bottle abutting the surface 28, it will compress the spring 52 and allow the levers 18 to lift off of the switches 43 and open the circuit to stop the drive.

Figure 5:
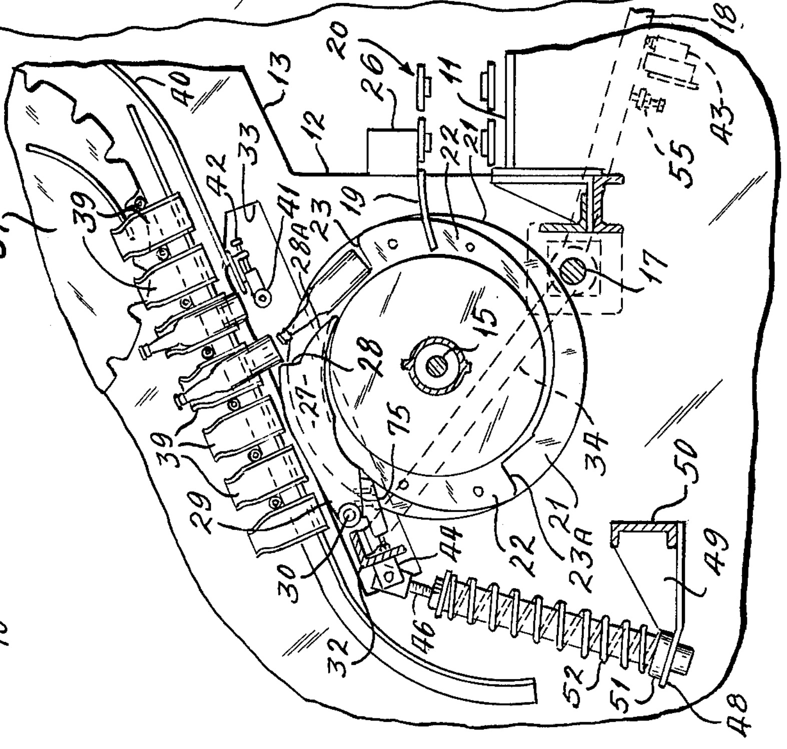
FIG. 5 is a fragmentary view of the operating means seen previously in FIG. 2, but with a bottle discharge condition in which the safety mechanism is adapted to function.

It is to be understood that the spring 52 is strong enough to overpower the weight of the assembly of the fingers 27 and rotate the arms 34 in the direction to hold the switches 43 in circuit make positions until a bottle jams and strikes a surface 28 on any one of the fingers 27. The bottle jam forces the finger 27 to move back and overpower the spring 52, thereby allowing one or both of the safety switches 43 to move to its open circuit condition. With the apparatus stopped due to a bottle not dropping as seen in FIG. 5, an operator can jiggle the arms 18 and pivot levers 34 which will move the angle bar 32 and the fingers 27. Thus jiggle of the fingers 27 within the limits determined by the stop means 55 is intended to cause the bottle to become unjammed and drop free. This action is confined to the fingers 27 and does not change the position of the bottles already supported by the cams 22 or the guide discs 21 so that the bottles which have dropped will not be disturbed or caused to topple.

Looking at FIG. 1 the main power input shaft 60 is driven by an electric motor (not shown) and the sprocket 61 on this shaft drives a sprocket 62 mounted on shaft 63. The drive chain 64 is provided with slack adjustment through a suitable sprocket gear cluster at 65. The shaft 63 carries a second sprocket 66 which is connected by a chain 67 to a sprocket 68 on the shaft 15 so that the cams 22 and discs 21 and the drum 29 are rotated at the desired speed.

Looking at FIGS. 1 and 3 it can be seen that the shaft 63 carries a gear 70 which meshes with a larger gear 71 carried on shaft 72. Shaft 72 also carries a smaller gear 73 in position to mesh with a gear 74 on the shaft 38 for carrier drive sprockets 37. This arrangement of gears and shafts produces a two-stage speed reduction between shaft 63 and shaft 38.

It is, of course, understood that the electrical current for the motor (not shown) drive to shaft 60 is wired into the normally closed safety switches 43, and the opening of either switch will stop the drive.

Figure 4:
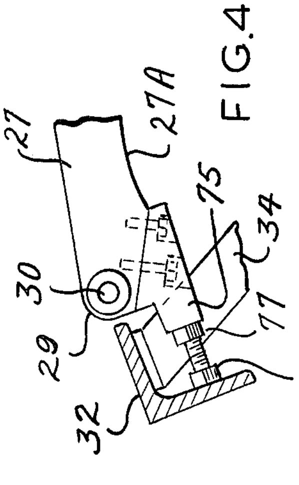
FIG. 4 is a fragmentary view of the adjustable support means for the fingers that are responsive to the failure of a bottle to drop properly.

One of the important features of the apparatus resides in the means for supporting the fingers 27 so that they do not drop down between the cams 22. As seen in FIGS. 2 and 4, each finger 27 is provided with a block 75 at the pivoted end 29, and each block carries an adjusting screw 76 in position to abut the angle bar 32. The screws 76 can be locked in adjusted position by a jam nut 77 once the free end of the finger 27 is located as desired. In some apparatus a drum type shaft is substituted for the shaft 15 and it then becomes important to use the adjustment means 76 (FIG. 4) to hold the fingers 27 from engaging on the drum and creating a drag effect.

RÉSUMÉ

The foregoing description relates to a presently preferred embodiment of the container discharger and safety mechanism. The action of the operating components may be seen best in FIGS. 2 and 5 where the discharge of the bottles is depicted. In FIG. 2 a bottle has passed over the roller 41 and has dropped onto the apex 23A of the cam step 23 that has moved under the gravity drop zone. The dropping bottle is guided by the extension 28A on the adjacent finger 27 into positive engagement on the cam step and causes the bottle to assume an inclined position with the crown ring suspended and out of contact with any structure. As the cam step moves down in a clockwise direction the bottle leaves the finger extension 28A and is firmly cradled on the facing cams 22 between the discs 21 which carry those cams. The bottle continues in this cradled condition until it is deposited on the fixed landing plate 19 and made ready to be pushed off toward the conveyor 20.

In FIG. 5 a condition is depicted wherein a first bottle has dropped correctly and a second or subsequent bottle has hung in the carrier pocket and is being pushed leftwardly against the abutment surface 28 on the finger 27. This pushing action causes the finger 27 to move back and pivot the arm 34 about the axis of shaft 17 against the lift of the spring 52 on the bar 32. The pivoting action of arm 34 moves the lever 18 off the switch 43 which breaks the circuit to the drive motor connected to shaft 60 (FIG. 1). It is clear that the movement of the finger 27 does not affect the bottle already cradled on the cam step 23, and if the lever 18 is jiggled up and down it will affect only the bottle that hung in the carrier pocket 39. The rightward advance of the finger extension 28A is arrested by the stop 55 (FIG. 2) before it can contact the bottle that has dropped properly, thereby assuring that there will be no chance of toppling or displacing that bottle.

The description relating to the actions occurring in FIGS. 2 and 5 has been given with reference to one bottle. However, it should be understood that the action relates to an entire row of bottles, and it is not uncommon to have 40 or more bottles in each row as the carrier pockets 39 pass the drop zone. The improvements herein set forth have been given in respect of the apparatus for discharging bottles from a washer with the objects in mind of avoiding damage to the bottles and protecting the components of the washer in the event of a faulty discharge of a bottle.

What is claimed is:

1. Discharge apparatus for containers moved by a pocketed conveyor into a discharge zone comprising: rotary cam means adapted to receive bottles in a gravity discharge zone from the conveyor pockets; bottle sensing finger means adjacent said cam means in said zone, said sensing finger means having a free end adjacent said cam means and an extension on said free end disposed in the path of the bottles moved into said discharge zone, means supporting said sensing finger means for movement between a normal position guiding the bottles dropped in said zone onto said cam means and a displaced position sensing a bottle jammed in said zone; means normally driving said pocketed conveyor and said cam means in timed relation, and a safety device to stop said drive, said safety device having a normal position corresponding to the normal position of said sensing means and the normal driving of said pocketed conveyor and cam means, and said safety device having a drive stop position corresponding to said displaced position of said sensing finger means, said safety device being moved into said drive stop position upon said sensing finger means moving to said displaced position.

2. Discharge apparatus for bottle conditioning apparatus in which: said apparatus comprises a conveyor, bottle carrying pockets moved by said conveyor through a gravity discharge zone, rotary cam means in said zone below said pockets in position to receive the bottles in a gravity drop, a fixed landing platform spaced below said discharge zone to receive the bottles from said cam means, said cam means including a pusher section to push the bottles across said platform, drive means connected to said conveyor and cam means to drive the same in time relation; and safety mechanism comprises a first element normally in an operative position to permit operation of said drive means and movable to a position to stop operation of said drive means, a second element disposed in said gravity zone in position to be engaged by each bottle reaching said zone, said second element having a normal position guiding the bottles onto said cam means and a displaced position corresponding to a bottle pushed against said second element due to failure to complete the gravity drop, and an operating connection between said first and second elements normally effective to maintain said first element in its normal position but moving said first element into said stop operation position in response to a bottle pushing said second element into said displaced position, said operating connection including a lever pivoted between its end and connected at one end to said second element, the opposite end of said lever extending to a position adjacent said first element, resilient means supporting said second element and said one end of said lever, and abutment means engaged by said lever to oppose said resilient means, said resilient means and said abutment means being adjustable.

3. Discharge apparatus for bottle conditioning apparatus in which: said apparatus comprises a conveyor, bottle carrying pockets moved by said conveyor through a gravity discharge zone, rotary cam means in said zone below said pockets in position to receive the bottles in a gravity drop, a fixed landing platform spaced below said discharge zone to receive the bottles from said cam means, said cam means including a pusher section to push the bottles across said platform, drive means connected to said conveyor and cam means to drive the same in time relation; and safety mechanism comprises a first element normally in an operative position to permit operation of said drive means and movable to a position to stop operation of said drive means, a second element disposed in said gravity zone in position to be engaged by each bottle reaching said zone, said second element having a normal position guiding the bottles onto said cam means and a displaced position corresponding to a bottle pushed against said second element due to failure to complete the gravity drop, and an operating connection between said first and second elements which includes a bar having a pivot connected to said second element, an arm connected at one end to said bar and pivotally supported at a position remote from said bar, load carrying means in the apparatus connected to said bar, an operating lever connected to said arm to respond to the motion of said arm about said pivot support, said load carrying means urging said bar and arm into positions supporting said second element in its normal position, said first element being disposed in the path of motion of said operating lever, whereby upon motion of said arm in response to a bottle pushing on said second element said operating lever moves said first element into the stop operation position.

4. The discharge apparatus for bottle conditioning apparatus set forth in claim 3, wherein said load carrying means includes a spring and means to vary the load carrying capacity of said spring.

5. The discharge apparatus for bottle conditioning apparatus set forth in claim 3, wherein stop means is disposed in the path of motion of said operating lever, said stop means opposing the urging of said load carrying means to fix the normal position of said second element.

6. Discharge apparatus for handling bottles to be discharged and moved to a conveyor, said apparatus comprising means forming a bottle drop zone, a plurality of discs mounted in spaced relation adjacent said drop zone and rotating on a common axis, cam means carried by said discs in facing pairs such that a bottle dropped at said drop zone is cradled between spaced discs on said facing pairs of cam means, a plurality of elongated bottle position sensing elements each one lying in the space between paired ones of said spaced discs and spaced above said facing pair of cam means, said sensing elements having a forward end formed with an abutment surface adjacent the drop zone and a rearward pivoted end remote from the drop zone, means to support said sensing elements out of contact with said cam means and independently of said discs, means to deliver bottles in successive order for gravity drop onto said cam means guided by said forward end of said sensing element, said sensing element support means including a bar connected to said pivoted remote ends, arms connected to said bar at spaced points and having pivots spaced from said drop zone, and resilient means holding said bar and all said sensing elements with said forward ends of said sensing element adjacent the drop zone, said arms and resilient means being mounted for permitting displacement of said sensing element upon any one thereof receiving a push from a bottle that has failed to complete the gravity drop, and means responsive to the movement of said arms to stop said bottle delivery means and the rotation of said discs.

7. The discharge apparatus of claim 6 wherein said arms are movable to jiggle said sensing elements into prodding the bottle failing to complete the gravity drop into completing the drop.

* * * * *